United States Patent
Schmalz

(10) Patent No.: US 9,606,810 B2
(45) Date of Patent: Mar. 28, 2017

(54) METHOD AND APPARATUS FOR REPLACING THE OPERATING SYSTEM OF A LIMITED-RESOURCE PORTABLE DATA CARRIER

(71) Applicant: GIESECKE & DEVRIENT GMBH, Munich (DE)

(72) Inventor: Frank Schmalz, Munich (DE)

(73) Assignee: GIESECKE & DEVRIENT GMBH, Munich (DE)

(*) Notice: Subject to any disclaimer, the term of this patent is extended or adjusted under 35 U.S.C. 154(b) by 65 days.

(21) Appl. No.: 14/408,388

(22) PCT Filed: Jun. 19, 2013

(86) PCT No.: PCT/EP2013/001814
§ 371 (c)(1),
(2) Date: Dec. 16, 2014

(87) PCT Pub. No.: WO2013/189600
PCT Pub. Date: Dec. 27, 2013

(65) Prior Publication Data
US 2015/0154030 A1    Jun. 4, 2015

(30) Foreign Application Priority Data

Jun. 22, 2012 (DE) ........................ 10 2012 012 509

(51) Int. Cl.
*G06F 21/57* (2013.01)
*G06F 9/44* (2006.01)
(Continued)

(52) U.S. Cl.
CPC .............. *G06F 9/4406* (2013.01); *G06F 8/65* (2013.01); *G06F 8/665* (2013.01); *G06F 9/4401* (2013.01);
(Continued)

(58) Field of Classification Search
CPC .. G06F 21/572; G06F 21/34; G06F 2212/177; G06F 8/65; G06F 9/4401; H04L 9/3263; H04L 63/0823
See application file for complete search history.

(56) References Cited

U.S. PATENT DOCUMENTS

2003/0188160 A1* 10/2003 Sunder .................... G06F 8/65
                                                           713/165
2004/0187035 A1    9/2004 Schwan et al.
(Continued)

FOREIGN PATENT DOCUMENTS

EP         2388151 A2    11/2011

OTHER PUBLICATIONS

Devine et al., "Smart Card Operating Systems: Past, Present and Future", 2003, pp. 1-18.*
(Continued)

*Primary Examiner* — Kenneth Chang
*Assistant Examiner* — Thaddeus Plecha
(74) *Attorney, Agent, or Firm* — Workman Nydegger

(57) ABSTRACT

A method for replacing the operating software of a limited-resource portable data carrier at a terminal includes controlling the operation of the data carrier and executing at least one function provided by the data carrier. The terminal includes new operating software, a bootstrap loader for loading new operating software, and a terminal certificate providing authorization for transmitting a loading key. In authentication of the terminal, the terminal certificate is transmitted to the data carrier and verified there and a loading key is transmitted to the data carrier. The operation control of the data carrier changes over to the bootstrap loader which deletes the present operating software of the data carrier and transmits the new operating software using the loading key from the terminal. The new operating
(Continued)

software is then verified and activated by the bootstrap loader which transfers the control of the data carrier to the new operating software.

10 Claims, 3 Drawing Sheets

(51) Int. Cl.
    *G06F 9/445*     (2006.01)
    *H04L 29/06*     (2006.01)
    *H04L 9/32*     (2006.01)
    *G06F 21/34*     (2013.01)

(52) U.S. Cl.
    CPC .......... *G06F 21/572* (2013.01); *H04L 9/3263* (2013.01); *H04L 63/0823* (2013.01); *G06F 21/34* (2013.01); *G06F 2212/177* (2013.01); *G06F 2221/033* (2013.01)

(56) References Cited

U.S. PATENT DOCUMENTS

| | | | |
|---|---|---|---|
| 2006/0026415 A1* | 2/2006 | Chen | G06F 8/65 713/2 |
| 2006/0230165 A1 | 10/2006 | Zimmer et al. | |
| 2008/0027871 A1* | 1/2008 | Seo | G06F 21/10 705/59 |
| 2008/0034151 A1* | 2/2008 | Lu | G06F 8/65 711/103 |
| 2009/0026275 A1 | 1/2009 | Tapler et al. | |
| 2010/0058058 A1* | 3/2010 | Busari | G06F 21/445 713/169 |
| 2012/0005480 A1* | 1/2012 | Batke | G06F 21/572 713/175 |
| 2012/0124568 A1* | 5/2012 | Fallon | G06F 9/4446 717/169 |
| 2012/0210317 A1* | 8/2012 | Dong | G06F 8/65 717/173 |
| 2012/0260244 A1* | 10/2012 | Keller | G06F 11/1433 717/173 |
| 2015/0172255 A1* | 6/2015 | Warnez | H04W 4/001 713/168 |

OTHER PUBLICATIONS

"Technical Guide TR-03110-1: Advanced Security Mechanisms for Machine Readable Travel Documents—Part 1—eMRTDs with BAC/PACEv2 and EACv1", Bundesamt fur Sicherheit in der Informationstechnik, Version 2.10, Mar. 20, 2012, 130 pages. Retrieved from the Internet: https://www.bsi.bund.de/ContentBSI/Publikationen/TechnischeRichtlinien/tr03110/index_htm.html.
International Search Report from PCT Application No. PCT/EP2013/001814, Sep. 25, 2013.
International Preliminary Report on Patentability from PCT Application No. PCT/EP2013/001814, Dec. 23, 2014.
Examination Report from German Application No. DE 102012012509.7, May 13, 2013.

* cited by examiner

Fig. 1a

| | |
|---|---|
| Personal data | 15 |
| Free memory | 42 |
| Loading reserve | 44 |
| Operating system | 13 |
| Cryptographic library | 46 |
| Symmetric cryptoalgorithm | 48 |
| Bootstrap loader | 14 |
| Loading key | 50 |
| Start address for data | 52 |

Fig. 1b

| | |
|---|---|
| Personal data | 15 |
| Free memory | 42 |
| | |
| | |
| | |
| Symmetric cryptoalgorithm | 48 |
| Bootstrap loader | 14 |
| Loading key 501 Verification key 502 | 50 |
| Start address for data | 52 |

Fig. 1c

| | |
|---|---|
| Personal data | 15 |
| Free memory | 42 |
| Symm. crypto-algorithm new | 481 |
| Bootstrap loader new | 141 |
| Operating system new | 131 |
| Cryptographic library new | 461 |
| Symmetric cryptoalgorithm | 48 |
| Bootstrap loader | 14 |
| Loading key 501 Verification key 502 | 50 |
| Start address for data | 52 |

Fig. 1d

| | |
|---|---|
| Personal data | 15 |
| Free memory | 42 |
| Loading reserve | 44 |
| Operating system new | 131 |
| Cryptographic library new | 461 |
| Symm. cryptoalgorithm new | 481 |
| Bootstrap loader new | 141 |
| Loading key 501 Verification key 502 | 50 |
| Start address for data | 52 |

METHOD AND APPARATUS FOR REPLACING THE OPERATING SYSTEM OF A LIMITED-RESOURCE PORTABLE DATA CARRIER

BACKGROUND

The invention relates to the replacement of the operating system in a limited-resource portable data carrier which has no or at most a restricted user interface. Primarily, the invention relates to the replacement of the operating system in data carriers of the chip card type or in data carriers with other form factors, whose main constituent is a smart card chip. In particular, the invention relates to the replacement of the operating system of a machine readable electronic identity document.

The control of personal data is more and more effected with the aid of machine readable electronic identification documents which typically contain a data page in the manner of a chip card or which are completely configured as a chip card or ID card in a similar format. Access and dealing with personal data are subject to special security requirements. Primarily, it must be ensured that access is not effected by unauthorized parties and that personal data are not impermissibly changed. Mechanisms for safeguarding the personal data are specified e.g. in the technical guideline TR-03110 "Advanced Security Mechanisms for Machine Readable Travel Documents", version 2.10, issued by the Federal Office for Information Security (BSI), (available at: https://www.bsi.bund.de/DE/Publikationen/TechnischeR-ichtlinien/tr03110/index_htm.html). In this guideline there are described, among other things, the protocol "Extended Access Control" (EAC) as well as the protocol "Password Authenticated Connection Establishment" (PACE). PACE is a mutual authentication mechanism executed between a chip of a machine readable identity document and a terminal, which is based on a common password. EAC is a protocol for mutual authentication executed between a chip of a machine readable identification document and a terminal, which comprises two sub-protocols, namely terminal authentication (TA) and chip authentication (CA). Within the framework of the terminal authentication, a terminal proves to the chip, with the aid of a sequence of certificates, the authorization for accessing personal data stored in the chip. In the chip authentication, the terminal verifies the authenticity of the chip and a secret symmetric key is agreed upon, with which the subsequent further data exchange is encrypted.

The mechanisms described in the TR-03110 ensure in an effective manner that only authorized terminals can access a chip of a machine readable electronic identification document and that, where applicable, read-out personal data stem from an authentic chip. The reading of personal data from the chip of an electronic identification document is thus sufficiently ensured by the TR-03110.

But bringing data into a machine readable electronic identification document, in particular bringing in data of the operating software of the chip of an electronic identification document, however, is not addressed by the TR-03110. The bringing in of operating software data of the chip of an electronic identification document has hitherto not played a role, because the operating system of usual smart card chips was typically stored in a ROM-memory and changes were only possible with considerable effort. In addition, the average lifetime of usual electronic identification documents is only a few years, typically one to three years, so that possibly required changes of the operating system could simply be performed by issuing a new card generation.

For the electronic identification documents upcoming now longer lifetimes of e.g. 10 years are demanded, however. If within such a lifetime a change of the operating system should become necessary, the hitherto practice to perform such changes with the next card generation may lead to considerable disadvantages. The case could occur that an important function provided by an identification document is no longer executable or it may become necessary to replace identification documents prematurely, which is connected with accordingly high costs.

Furthermore, from the US 2009/0026275 A1 there is known an automatically configurable smart card in which generic data are recognized and are migrated when the smart card is booted for the first time.

The EP 2 388 151 A2 discloses a manufacturing process for an electronic passport (e-passport). The passport also has, besides an operating system, a logical data structure (LDS). This data structure can be updated without changing the operating system.

SUMMARY

It is therefore object of the invention to state a method which allows the operating system of a chip of a machine readable electronic identification document to be securely replaced in the field.

This object is achieved by a method having the features of the main claim. The object is also achieved by an object having the features of the independent apparatus claim.

The method according to the invention has the advantage that the operating system of a chip of an electronic identification document can be replaced in the field without the structure of the electronic identification document having to be changed. In the case of a replacement stored personal data can be advantageously retained and do not have to be provided anew. The method according to the invention further has the advantage that, when the mechanisms described in the TR-03110 are used, only minor changes are required there. The invention makes use of the fact that the operating system in newer smart-card chips can be stored as a whole or substantial parts thereof in a non-volatile overwritable memory, in particular a flash memory.

By the introduction of a new terminal certificate it is ensured, in connection with the employment of a loading key, that only original software provided by the issuer of an electronic identification document passes into an identification document.

The method according to the invention advantageously allows the issuer of an electronic identification document to have at any time control over the time at which a certain version of an operating software is installed on an electronic identification document.

Advantageous developments and expedient embodiments of the invention result from the features of the dependent claims.

An embodiment of the invention will hereinafter be explained in more detail with reference to the drawing.

BRIEF DESCRIPTION OF THE DRAWINGS

There are shown:

FIG. 1 the occupancy of the memory arrangement of a portable data carrier upon the replacement of operating software at different points in time, FIG. 2 a flowchart of the replacement of the operating system of a portable data carrier, and FIG. 3 the structure of a portable data carrier and of a terminal.

DETAILED DESCRIPTION OF VARIOUS EMBODIMENTS

Figure 3:
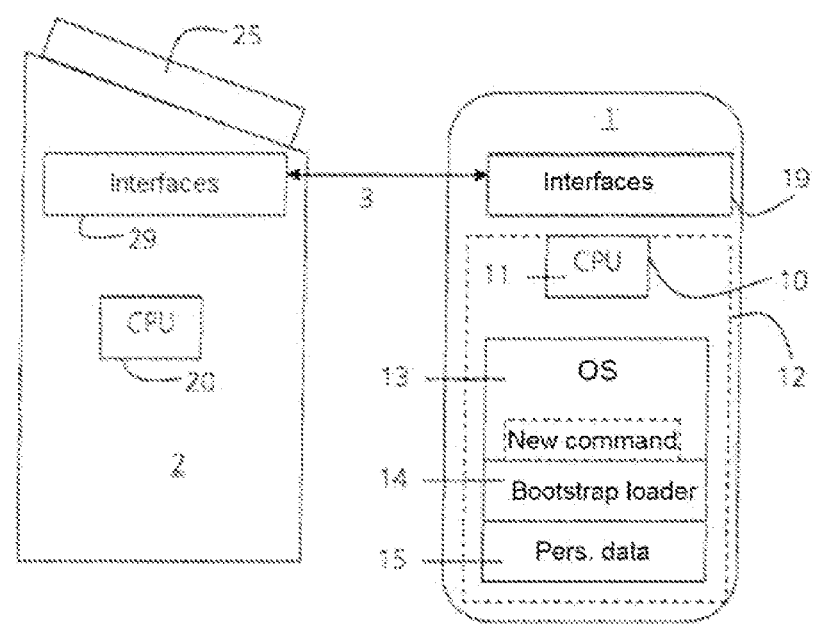

The arrangement on which the following description is based is represented in a simplified form in FIG. 3. It comprises a limited-resource portable data carrier 1 which communicates via a data connection 3 with a terminal 2. The limited-resource portable data carrier 1 in standard operation provides at least one user-related function, within the framework of which personal data are accessed which are stored on the data carrier 1. For example, the data carrier outputs, on request of a terminal 2, the address of a user via the data connection 3 to the terminal 2 or creates a signature over a data set submitted by the terminal 2.

The limited-resource portable data carrier 1 often has a card-shaped form and is configured e.g. in the format of a chip card or as a data page for a passport booklet. But other form factors are also possible: for example the limited-resource portable data carrier 1 can be present in the format of a SIM card or be configured in the form of a clothing object, for instance a watch.

In the following it is assumed, without excluding other embodiments herewith, that the limited-resource portable data carrier 1 is configured as a machine readable electronic identification document. This embodiment is a preferred application possibility.

Substantial component of the electronic identification document 1 is a microcontroller 10 which has a central processor unit 11 as well as a non-volatile memory arrangement 12.

The microcontroller 10 is typically configured in the form of a monolithic circuit which is particularly protected against manipulations by its small dimensions as well as by further measures. The microcontroller 10 has basically the same functionality as a standard microcontroller for PCs and possesses the same basic structure with the typical basic components. Due to its small physical size—the base area typically lies under 10 mm²—its performance is limited, however. Structure and configuration of suitable microcontrollers 10 for limited-resource portable data carriers 1 are per se known and described for example in "Handbuch der Chipkarten", W. Rankl, W. Effing, 5th edition, Hansa-Verlag Muenchen; explicit reference is generally made to these statements. Corresponding to its typical design, the microcontroller 10 is hereinafter referred to as chip.

In the memory arrangement 12 there is stored the operating software of the electronic identification document 1. It is divided into three regions, namely the operating system 13, a bootstrap loader 14—often also referred to as bootloader—as well as a region 15 having personal data of a user, which may additionally contain application data for executing a function provided by the identification document 1.

The memory arrangement 12 is of the non-volatile type. Expediently, it is completely configured in the form of a flash memory; alternatively, it can be provided to configure a part of the memory arrangement 12 as a memory of the ROM-type and to store a part of the data, in particular the data of the operating system 13 and/or of the bootstrap loader 14, in a memory part configured as a ROM.

The operating system 13 in standard operation controls the function of the data carrier 1. It is adapted to execute protocols for safeguarding the personal data. In particular, it is adapted to execute the protocols described in the guideline TR-03110. The set of commands which is employed for this is extended by an additional or new command, however. This additional command allows a terminal 2 to transmit a loading key to the operating system 13.

The bootstrap loader 14 is adapted to transmit, where applicable, a new operating system 131 to the electronic identification document 1. In a preferred realization the bootstrap loader 14 is adapted to operate a secure end-to-end connection to a terminal 2. Alternatively, the bootstrap loader 14 can be adapted to receive encrypted operating system images without secure end-to-end connection.

The electronic identification document 1 further possesses an interface 19 via which a data exchange with a terminal 2 is possible. The interface 19 is preferably configured as a contactless interface, but can also be configured as a contact-type interface. Likewise, both a contactlessly working and a contact-type interface 19 can be provided.

The electronic identification document 1 often possesses no user interface on its own for the output of data to a user or for receiving data inputted by a user. Sometimes there can be provided both a reduced output interface, e.g. in the form of some light emitting diodes or of a simple, e.g. single-line display, and simple input means, e.g. in the form of individual keys or of a sensor, for instance a fingerprint sensor.

The terminal 2 acts as a reading device vis-à-vis the electronic identification document 1. It possesses a central processor unit 20 as well as an interface 29 corresponding to the interface 19 of the electronic identification document 1. The terminal 2 typically further possesses a user interface 25 via which outputs to a user or inputs by a user to the terminal 2 are possible. The terminal 2 is adapted to execute the protocols specified in the TR-03110 for safeguarding personal data.

The terminal 2 can have the form of a stationary device, for instance in the manner of an automatic cash dispenser, or be configured in the form of a transportable device, for instance in the manner of a portable credit card terminal. The terminal 2 can also be a PC or a comparable computer which is connected e.g. via the Internet with the electronic identification document 1.

Via the data connection 3 there are carried out protocols with which functions provided by the electronic identification document 1 are executed. Expediently, via the data connection 3 there can further be executed the protocols described in the TR-03110. In particular, the protocols PACE and EAC can be expediently carried out. Alternatively or additionally, other protocols for safeguarding the personal data 15 can be carried out.

FIG. 1A shows an occupancy of the memory arrangement 12 in more detail. The occupying with data contents in the example is effected such that the available memory region is divided into nine blocks, namely: a data block 15 for personal data and application data, a free memory region 42 for being freely occupied, a loading reserve region 44 especially reserved for holding additions to the operating software, the operating system 13, a cryptographic library 46 for providing encryption mechanisms which the operating system 13 uses upon carrying out the functions of the identification document, a block 48 in which there is stored a symmetric cryptoalgorithm for reloading operating software, which cryptoalgorithm is also accessible by the bootstrap loader 14, the bootstrap loader 14, a block 50 for holding loading keys 501 and verification keys 502 for the reloading of operating software, as well as a block 52 for holding a start address of the personal data stored in the block 15.

The memory spaces occupied by the various data contents in the memory arrangement 12 have, as indicated in FIG. 1A, different sizes; the relations shown are only exemplary and shall in no way stipulate a binding real division. Typically, however, the operating system 13 occupies a relatively great portion of the available total memory region, and the memory space available for the free memory region 42 as well as for the loading reserve 44 in comparison is relatively small. The edging with a thick line illustrates that in standard operation the operating system 13 controls, using the cryptographic library 46, the function of the electronic identification document 1.

The operating system 13, the bootstrap loader 14 and the cryptographic library 46 are usually already installed when the electronic identification document 1 is issued to a user; in the block 50 there expediently lies additionally a loading key already upon the issuance. The first installation of this operating software is normally effected by a software producer or a producer of identification documents, not by the issuer.

In a favorable case the operating software installed first can remain unchanged over the entire lifetime of the electronic identification document. On account of technical developments or a change of given basic conditions, for instance the introduction of new security standards, it can occur, primarily with long lifetimes of e.g. 5 years and more, that an adjustment of the operating software becomes necessary. In such a case the above-described electronic identification document 1 allows the replacement of operating software.

For this purpose the certificate employed for the terminal authentication is extended and a modified terminal certificate is defined, which proves to the electronic identification document 1 that a terminal 2 is authorized to load a new operating system. The modified terminal certificate contains, in addition to the usual fields, a verification key for verifying the authenticity of a new operating system to be loaded.

Figure 2:
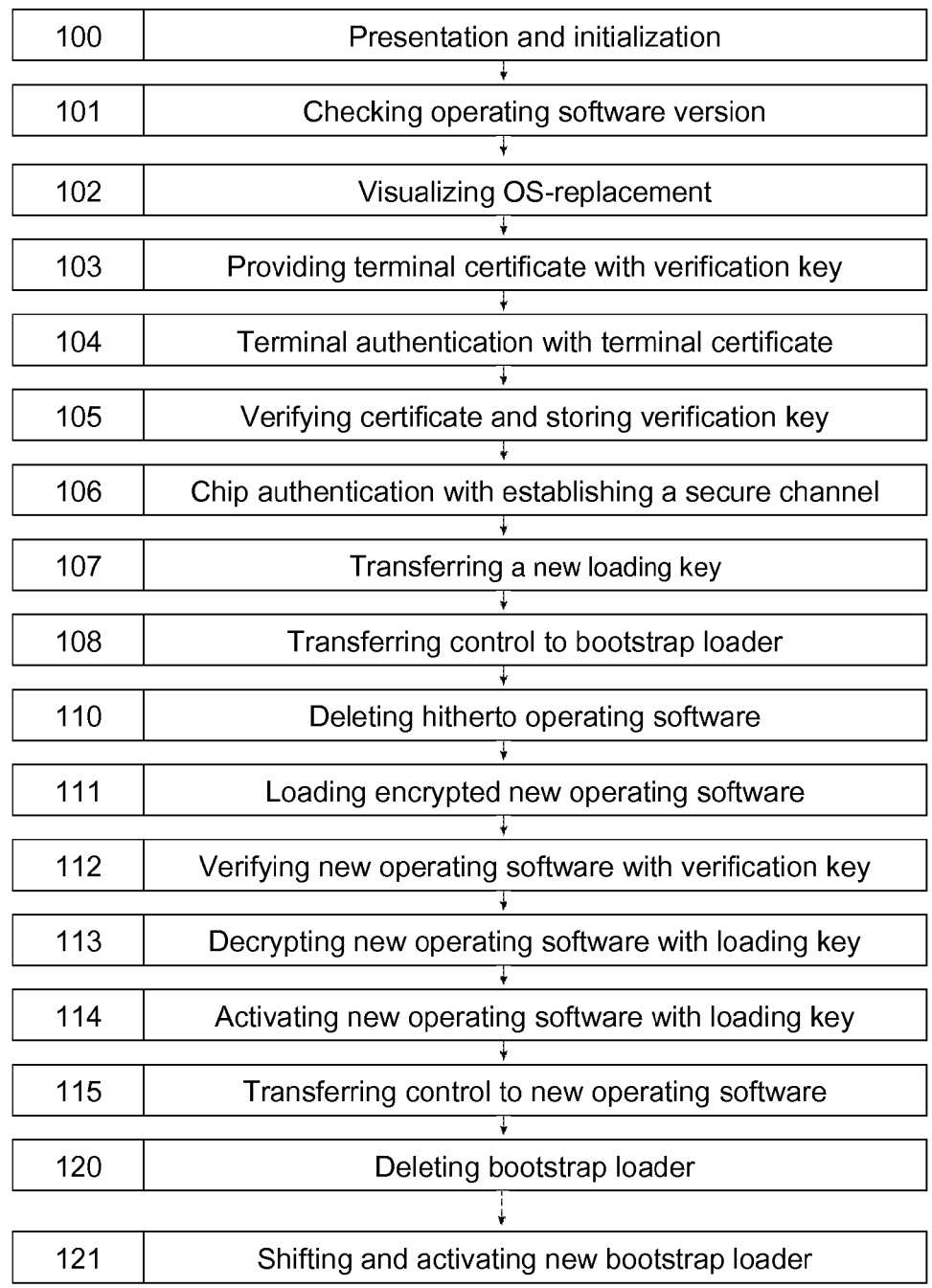

FIG. 2 illustrates as a flowchart the course of the replacement of the operating system as well as of further components of the operating software of an electronic identification document 1. In the FIGS. 1B, 1C, 1D there are represented occupancies of the memory arrangement 12 arising at different points in time when operating software is executed.

For the following course it is assumed that the operating system 13 of the presented electronic identification document 1 is to be exchanged. An operating system 131 to be newly loaded is available for this purpose in the terminal 2, typically as a so-called COS (card operating system) image, i.e. as not yet activated code of the operating system 131 to be loaded. Typically, the operating system 131 to be loaded is provided by a trustworthy background system of the issuer of the electronic identification document 1. The image of the new operating system 131 itself is normally made available to the issuer of the electronic identification document 1 by an external supplier, e.g. a software producer.

Together with the operating-system image 131 there is normally also made available a new loading key 501. Typically, the operating system image 131 and the new loading key are provided already in encrypted form: the operating system image 131 is encrypted with the new loading key 501 and the new loading key 501 with the last, preceding loading key. Expediently, there is further provided a cryptogram which contains the new loading key 501 in all the encryptions possible with the preceding loading keys. As normally together with the operating system 13 there is always also replaced the cryptographic library 46, for the description of the course this library is generally considered a part of the operating system 131 to be loaded and will no longer be continuously mentioned separately.

Upon the replacement of the operating software the electronic identification document 1 is not operated in the standard operation to execute a user-related function, but in an updating mode in which user-related functions at least first are not executed.

The method is initiated, step 100, by the electronic identification document 1 being presented to a suitable terminal 2 and initialized. In a first step there is expediently effected an authentication protected by a password for proving the authorization of a user. The execution can expediently be effected using the PACE protocol according to TR-03110. According to this protocol at the same time there is established a secure messaging connection between the terminal 2 and the electronic identification document 1.

Subsequently, there follows a step in which there is ascertained that a replacement of the operating system 13 is necessary. The step can be ascertained e.g. by the terminal 2 checking the current operating software version or the current operating system version, step 101.

If the necessity of an operating system replacement was detected, the terminal 2 changes into the updating mode. Expediently, this special operating state is visualized to the user via the user interface 25 of the terminal 2, e.g. by a corresponding display "replacement of the operating system", step 102.

The terminal 2 then requests a terminal certificate from a trustworthy background system of the issuer of the electronic identification document. The trustworthy background system thereupon forms a modified terminal certificate by inserting a verification key 502 into a usual terminal certificate as it is provided for instance according to TR-03110. The verification key 502 is expediently formed by forming in a per se known manner a hash or a MAC (message authentication code) value over the code of the operating system to be newly loaded. The verification key enters into the signature of the terminal certificate and is thus protected from manipulation. If the terminal authentication is effected, as provided according to TR03110, by means of a chain of certificates, the modification is expediently done by inserting the verification key as additional information into the respectively last verified certificate of the chain. The such formed modified terminal certificate is provided to the terminal 2 by the trustworthy background system, step 103.

Using the terminal certificate, which was modified by the insertion of the verification key 502, a terminal authentication is carried out, step 104. Therein, the terminal 2 proves to the chip 10 of the electronic identification document 1 its authorization for accessing and for changing the data stored in the memory arrangement 12. Expediently, a terminal authentication of version 2 according to the TR-03110 is carried out. Within the framework of the terminal authentication, the terminal 2 typically sends to the electronic identification document 1 a chain of certificates which is verified by the operating system 13 of the electronic identification document 1. The last certificate of the chain expediently is here the modified terminal certificate. With the public key contained in the last certificate of the chain the chip 10 expediently also carries out the actual terminal authentication, e.g. by a challenge-response data exchange. In the case of a positive authentication, the operating system 13 stores the verification key 502 contained in the terminal certificate in the block 50 of the memory arrangement 12, step 105.

In the following step 106, a chip authentication is carried out; this is expediently done in the form of a chip authentication of version 2 according to TR-03110. Within the framework of the chip authentication, by applying a Diffie-Hellman algorithm there is agreed a secure channel to the terminal 2.

Subsequently, with a command of the terminal 2 a new loading key 501 is delivered to the operating system 13, step 107. The new loading key 501 is preferably encrypted with the preceding loading key of the last update or with the loading key stored upon the issue of the electronic identification document 1. For making possible a decryption of the new loading key even when this is not the one that is directly next to the preceding key stored last, to the operating system 13 there is expediently delivered together with the new loading key 501 a cryptogram having all the encryptions that are possible with preceding loading keys. If the new loading key 501 is encrypted, the operating system 13 decrypts it with the preceding loading key or with a suitable loading key which it takes from the cryptogram. The operating system 13 also stores the decrypted new loading key 501 in the block 50 of the memory arrangement 12. Then the operating system 13 transfers the control to the bootstrap loader 14, step 108.

After taking over the control, the bootstrap loader 14 deletes the hitherto operating system 13, step 110.

FIG. 1B illustrates the state in the memory arrangement 12 after the step 110 has been carried out. At this point in time the bootstrap loader 14 has the control over the function of the electronic identification document 1. By the deletion of the hitherto operating system 13 the free memory region 42, taking into account the loading reserve 44, is clearly enlarged compared to the initial situation according to FIG. 1A.

Then the bootstrap loader 14 loads the image of the new operating system 131 provided on the terminal 2 into the memory region in the memory arrangement 12 which has become free by the deletion of the hitherto operating system, step 111.

FIG. 1C shows the occupancy of the memory arrangement 12 after the execution of the step 111. At this point in time the bootstrap loader 14 has in unchanged fashion the control over the function of the electronic identification document 1. In the free memory 42 there are now loaded a new operating system 131 and a new cryptographic library 461, however. Furthermore, a new bootstrap loader 141 as well as a new symmetric cryptoalgorithm 481 are loaded—the reloading of these components will be explained later. But the newly loaded components 131, 141, 461 and 481 are still not activated and still encrypted with the new loading key.

When the entire image of the new operating system 131 has been transmitted, the bootstrap loader 14 verifies the image of the new operating system 131 with the aid of the verification key, step 112.

If this verification is successful, the bootstrap loader 14 decrypts the image of the new operating system 131 with the new loading key 501, step 113. By suitable measures such as e.g. check sums or padding, the integrity of the operating system image and of the decrypted new operating system 131 is ensured.

Subsequently, the bootstrap loader 14 activates the new operating system 131 and transfers the control to the new operating system, step 114.

In supplementary steps, the bootstrap loader 14 can be replaced by a new bootstrap loader 141, analogously. However, these steps are optional and may be omitted accordingly. If a new bootstrap loader 141 is to be installed, the new bootstrap loader 141 is expediently transmitted together with the new operating system 131 in step 112 and stored in the region of the free memory 42 which has become free by the deletion of the hitherto operating system 13. After the activation of the new operating system 131 this deletes the hitherto bootstrap loader 14, step 120. Subsequently, the new operating system 131 writes in an internal restoring process the new bootstrap loader 141 into the place of the deleted hitherto bootstrap loader 14 and activates the new bootstrap loader, step 121.

In the same way as described above with reference to the new operating system and to the new bootstrap loader and represented in FIG. 1, there can furthermore also be effected a replacement of the symmetric cryptoalgorithm 48. Expediently, the new symmetric cryptoalgorithm 48 is replaced together with the operating system 13. I.e. the new symmetric cryptoalgorithm 481 is first written, together with the new operating system 131 and where applicable the new bootstrap loader 141, into the region of the memory 42 which has become free by the deletion of the hitherto operating system 13.

After the activation of the new operating system 131, this shifts the new symmetric cryptoalgorithm 481 in-memory to the place of the hitherto symmetric cryptoalgorithm 48 and finally activates the new symmetric cryptoalgorithm 481. Expediently, this is done together with the shifting and activating of the new bootstrap loader 141.

After the activation of the new operating system 131 and of the new cryptographic library 461 as well as where applicable the activation of the new bootstrap loader 141 and/or of the new symmetric cryptoalgorithm 481, the operating software of the electronic identification document 1 is completely or in parts replaced.

FIG. 1D shows the occupancy of the memory arrangement after all the described replacement processes have been carried out. Now the new operating system 131, which uses the new cryptographic library 461, has the control over the function. The original symmetric cryptoalgorithm 48 and the original bootstrap loader 14 were replaced by a new symmetric algorithm 481 and a new bootstrap loader 141, respectively.

Within the framework of the basic idea the above-described invention allows a number of further simple modifications, which will not be described in detail herein. So the described method steps can in part be executed in a divergent order. For example, the replacement of the cryptographic library 46 can be effected independently of the replacement of the operating system 13. Generally, the exchangable components 13, 14, 46, 48 of the operating software can be replaced individually and independently of each other. Further, it is possible to insert intermediate steps, in particular for increasing the security. For example, before the deletion of the old operating system a new PIN verification can be effected. If an operating software 13 has further or other components, there can further also these be replaced in basically the same way as described above with reference to the replacement of the operating system and of the bootstrap loader.

LIST OF REFERENCE SIGNS 1 limited-resource data carrier (electronic identification document)

2 terminal (reading device)
3 data connection
10 microcontroller (chip)
11 CPU (portable data carrier)
12 memory arrangement
13 operating system
14 bootstrap loader
15 memory block for personal and application data
19 interface
20 CPU (terminal)
29 interface
42 free memory
44 loading reserve
46 cryptographic library
48 symmetric cryptoalgorithm
50 memory block for holding keys
501 (new) loading key
502 verification key
52 start address for data
100-121 method steps
131 new operating system
141 new bootstrap loader
461 new cryptographic library
481 new symmetric cryptoalgorithm

The invention claimed is:

1. A method for replacing a first operating system software of a limited-resource portable data carrier at a terminal, the method comprising the steps of:
   providing a new operating system software in the terminal;
   providing a first bootstrap loader, the first bootstrap loader being configured to load the new operating system software in the data carrier;
   providing a terminal certificate in the terminal, which proves authorization for the terminal to transmit a loading key;
   transmitting the terminal certificate to the data carrier within a framework of an authentication protocol;
   verifying the terminal certificate by the data carrier;
   transmitting the loading key to the data carrier;
   transferring operational control of the data carrier to the first bootstrap loader;
   deleting the first operating system software of the data carrier by the first bootstrap loader;
   transmitting the new operating system software to the data carrier using the loading key;
   activating the new operating system software by the first bootstrap loader;
   transferring the operational control of the data carrier from the first bootstrap loader to the new operating system software.

2. The method according to claim 1, wherein in the terminal or at a trustworthy background system of an issuer of the data carrier a verification key is formed and inserted into the terminal certificate.

3. The method according to claim 2, wherein a verification of the new operating system software is effected with the verification key.

4. The method according to claim 2, wherein the verification key is generated by forming a hash or a message authentication code (MAC) over code of the new operating system software.

5. The method according to claim 1, wherein the first bootstrap loader stores the new operating system software in the data carrier.

6. The method according to claim 1, wherein under control of the new operating system software a new bootstrap loader is loaded into the data carrier.

7. The method according to claim 6, wherein after the loading of the new bootstrap loader the first bootstrap loader is deleted and the new bootstrap loader is written at a place the first bootstrap loader was written.

8. The method according to claim 1, wherein under control of the new operating system software a new cryptoalgorithm is loaded into the data carrier.

9. The method according to claim 1, wherein for transmitting the new operating system software a secure end-to-end connection between the terminal and the data carrier is established.

10. An apparatus for replacing a first operating system software of a limited-resource portable data carrier, the apparatus comprising:
   an interface for exchanging data with a terminal;
   a bootstrap loader for loading a new operating system software;
   a device for receiving a terminal certificate from the terminal within a framework of an authentication protocol, which terminal certificate proves authorization for the replacement of the first operating system software and for the terminal to transmit a loading key;
   a device for verifying the terminal certificate;
   a device for receiving the loading key from the terminal;
   a device for storing the loading key on the data carrier;
   a device for transferring operational control to the bootstrap loader;
   wherein the bootstrap loader has:
   a device for deleting the first operating system software of the data carrier;
   a device for receiving the new operating system software using the loading key of the terminal;
   and wherein the bootstrap loader is adapted:
   to verify the new operating system software in the data carrier,
   to activate the new operating system software, and
   to transfer the operational control of the data carrier to the new operating system software.

* * * * *